United States Patent
Cheng et al.

(10) Patent No.: US 7,050,424 B2
(45) Date of Patent: May 23, 2006

(54) METHOD AND SYSTEM FOR AUTOMATIC PROXY SERVER WORKLOAD SHIFTING FOR LOAD BALANCING

(75) Inventors: Shih-An Cheng, Milpitas, CA (US); JianMin Wu, San Jose, CA (US); Huang-Ming Pan, San Jose, CA (US)

(73) Assignee: Innomedia PTE Ltd., The Alpha (SG)

( * ) Notice: Subject to any disclaimer, the term of this patent is extended or adjusted under 35 U.S.C. 154(b) by 963 days.

(21) Appl. No.: 10/036,561

(22) Filed: Dec. 31, 2001

(65) Prior Publication Data

US 2003/0123432 A1 Jul. 3, 2003

(51) Int. Cl.
H04L 12/66 (2006.01)

(52) U.S. Cl. ............................... 370/352; 709/225

(58) Field of Classification Search ............ 370/352, 370/237, 400, 229–235; 709/229
See application file for complete search history.

(56) References Cited

U.S. PATENT DOCUMENTS

| | | | | |
|---|---|---|---|---|
| 6,128,279 A * | 10/2000 | O'Neil et al. | ............... | 370/229 |
| 6,141,341 A | 10/2000 | Jones et al. | ............... | 370/352 |
| 6,259,691 B1 | 7/2001 | Naudus | ............... | 370/352 |
| 6,725,253 B1 * | 4/2004 | Okano et al. | ............... | 709/203 |
| 6,795,867 B1 * | 9/2004 | Ma et al. | ............... | 709/240 |
| 2001/0049790 A1 * | 12/2001 | Faccin et al. | ............... | 713/185 |
| 2005/0010754 A1 * | 1/2005 | Brendel | ............... | 713/153 |

FOREIGN PATENT DOCUMENTS

| WO | WO 01/05115 A2 | 1/2001 |
|---|---|---|
| WO | WO 01/76276 A2 | 10/2001 |

* cited by examiner

*Primary Examiner*—Chau Nguyen
*Assistant Examiner*—Jung Park
(74) *Attorney, Agent, or Firm*—Renner, Otto, Boisselle & Sklar, LLP (57) ABSTRACT

A system and method for providing a Voice-over-Internet Protocol (VoIP) system is disclosed. The VoIP system includes a network including at least two VoIP proxy servers configured to shift workload automatically and to allow voice data to be transmitted and received over the network and at least one VoIP client operatively is coupled to the network to transmit and receive voice data over the network.

8 Claims, 5 Drawing Sheets

METHOD AND SYSTEM FOR AUTOMATIC PROXY SERVER WORKLOAD SHIFTING FOR LOAD BALANCING

TECHNICAL FIELD

The present invention generally relates to Internet Protocol (IP) telephony and, more specifically, relates to a method and system for automatic proxy server workload shifting for load balancing.

BACKGROUND ART

IP telephony is a collection of technologies that emulates and extends today's circuit-switched telecommunications services to operate on packet-switched data networks based on the Internet Protocol (IP) IP telephony encompasses the terms "Internet Telephony", "voice-over-IP" (VoIP), "video-over-IP", and "fax-over-IP", and extends those capabilities even further to include new telecommunications applications made possible by the convergence of voice, video and data. "Voice-over-IP" (VoIP) technology enables the real-time transmission of voice signals as packetized data over "IP networks" that employ the Transmission Control Protocol (TCP), Real-Time Transport Protocol (RTP), User Datagram Protocol (UDP), and Internet Protocol (IP) suite, for example.

A conventional Public Switched Telephone Network (PSTN) provides its users with dedicated, end-to-end circuit connections for the duration of each call. Based on the calling and called parties' numbers, circuits are reserved among an originating switch, any tandem switches along the route between the two ends of the call, and a terminating switch. Signaling between these PSTN switches supports basic call setup, call management, and call teardown as well as querying of databases to support advanced services such as local number portability, mobile subscriber authentication and roaming, virtual private networking, and toll-free service.

The conventional PSTN has served voice traffic well over the last 100 years, but its success has been paralleled by a rise of separate networks to support data traffic. These separate networks include, for example, the World-Wide Web which is commonly referred to as the Internet, an Intranet, a wide-area network (WAN), a local area network (LAN), an ATM, a T1 network, an E1 network, an Ethernet, a microwave network, a satellite network or the like, or a combination thereof. Clearly, use of distinct networks for voice and data represents an additional burden to service providers and an additional cost to consumers. As more and more PSTN traffic becomes data-oriented, however, the trend toward voice and data network convergence becomes stronger and stronger. Service providers, Internet service providers, and manufacturers of switching, transmission, and customer premises equipment are all participating in a significant shift of the telecommunications industry toward combined voice/video/data networking using IP.

The shift to IP telephony promises better efficiencies in the transport of voice and data, and, as a result, lower telecommunications costs to end users. Moreover, as IP telephony evolves, it will be able to match all the features of voice communications currently supported by the PSTN. Interoperability among the IP telephony products of different vendors is the first major hurdle to overcome. The real promise of IP telephony, however, will be realized with the next wave of advanced services that will begin to surpass the capabilities of the PSTN.

There are, however, some drawbacks associated with existing IP telephony systems. For example, in VoIP systems, most VoIP clients need to connect to a VoIP proxy server in order to complete a call. After the VoIP client connects to a VoIP proxy server, the overall system can provide services for the VoIP client. In conventional systems, since the VoIP proxy server is responsible for tracking the status of each connected VoIP client, on going calls and other services, the VoIP proxy server may be overloaded if too many clients attempt to connect to it. This may reduce the quality of service. This also increases the workload on the designated VoIP proxy server, even though other VoIP proxy servers in the VoIP system may have much lower workloads. This occurs even if the VoIP client connects to VoIP proxy servers connected in a conventional round robin manner. Round robin connection does not guarantee that the workload will be equally distributed among the VoIP proxy servers. In many instances, the VoIP client lacks information on the workload of each VoIP proxy server and is unable to connect to a less loaded VoIP proxy server. One attempted solution is to configure multiple proxy servers to receive a request to connect from a VoIP client. One of the proxy servers is configured as the primary proxy server. If the VoIP client cannot connect to the primary proxy server, then the VoIP client transmits a request to a secondary VoIP proxy server. The VoIP client may be configured to attempt to connect to each of the VoIP proxy servers in the VoIP proxy server group in a predefined sequence by directly transmitting the request to connect to each one. Alternatively, service providers provide a list of available servers and let the user try and pick a less busy one. This places the burden on the user who must manually select a VoIP proxy server from the list and attempt to connect to the newly selected VoIP proxy server. In this scenario, the user usually lacks information on the workload level of the VoIP proxy servers and relies on "luck" to select a less loaded VoIP proxy server with which to attempt to connect.

Therefore, there exists a strong need in the art for a system and method which automatically identifies and utilizes the VoIP proxy server with a lower workload. Such a system and method would provide the identity of the VoIP proxy server with the lower workload to the VoIP client in order to more efficiently complete the call.

SUMMARY OF THE INVENTION

According to one aspect of the invention, the invention is a Voice-over-Internet Protocol (VoIP) system. The VoIP system includes a network including at least two VoIP proxy servers configured to shift workload automatically and to allow voice data to be transmitted and received over the network and at least one VoIP client operatively is coupled to the network to transmit and receive voice data over the network.

BRIEF DESCRIPTION OF DRAWINGS

These and further features of the present invention will be apparent with reference to the following description and drawings, wherein.

DISCLOSURE OF INVENTION

To illustrate the present invention in a clear and concise manner, the drawings may not necessarily be to scale and certain features may be shown in a partial schematic format.

The present invention is a VoIP system including a plurality of VoIP proxy servers configured to balance workload by automatically shifting to a next predefined VoIP proxy server if the current VoIP proxy server has a workload above a predefined threshold. In one embodiment, a VoIP client communicates with a primary VoIP proxy server before connecting to one of the VoIP proxy servers, i.e., the VoIP proxy server with a workload below a predefined threshold. Further, the invention includes a method for determining and identifying the VoIP proxy server with the lower workload based on a predefined workload threshold. Further, the method includes providing the identity of the VoIP proxy server to the VoIP client so that the VoIP client may connect.

The primary VoIP proxy server is the portal through which the VoIP client connects with the plurality of VoIP proxy servers. When the primary VoIP proxy server receives a client request to connect from a VoIP client wanting to connect to the VoIP system, the plurality of VoIP proxy servers configured to shift workload automatically determine and identify the VoIP proxy server with the lower workload by automatically forwarding the client request to connect to one of the VoIP proxy servers whose workload is below a predefined threshold. This may be the primary VoIP proxy server or it may be a VoIP proxy server included in a predefined group of VoIP proxy servers with a specific predefined priority relationship or hierarchy between the VoIP proxy servers of the group. In response to the client request to connect, the primary VoIP proxy server provides the identity of the VoIP proxy server able to handle the call to the VoIP client. The VoIP client then connects to the identified VoIP proxy server and accesses the VoIP system. The VoIP client connects to the identified VoIP proxy server for the duration of the call. Thus, the workload is balanced among the VoIP proxy servers.

Figure 1:
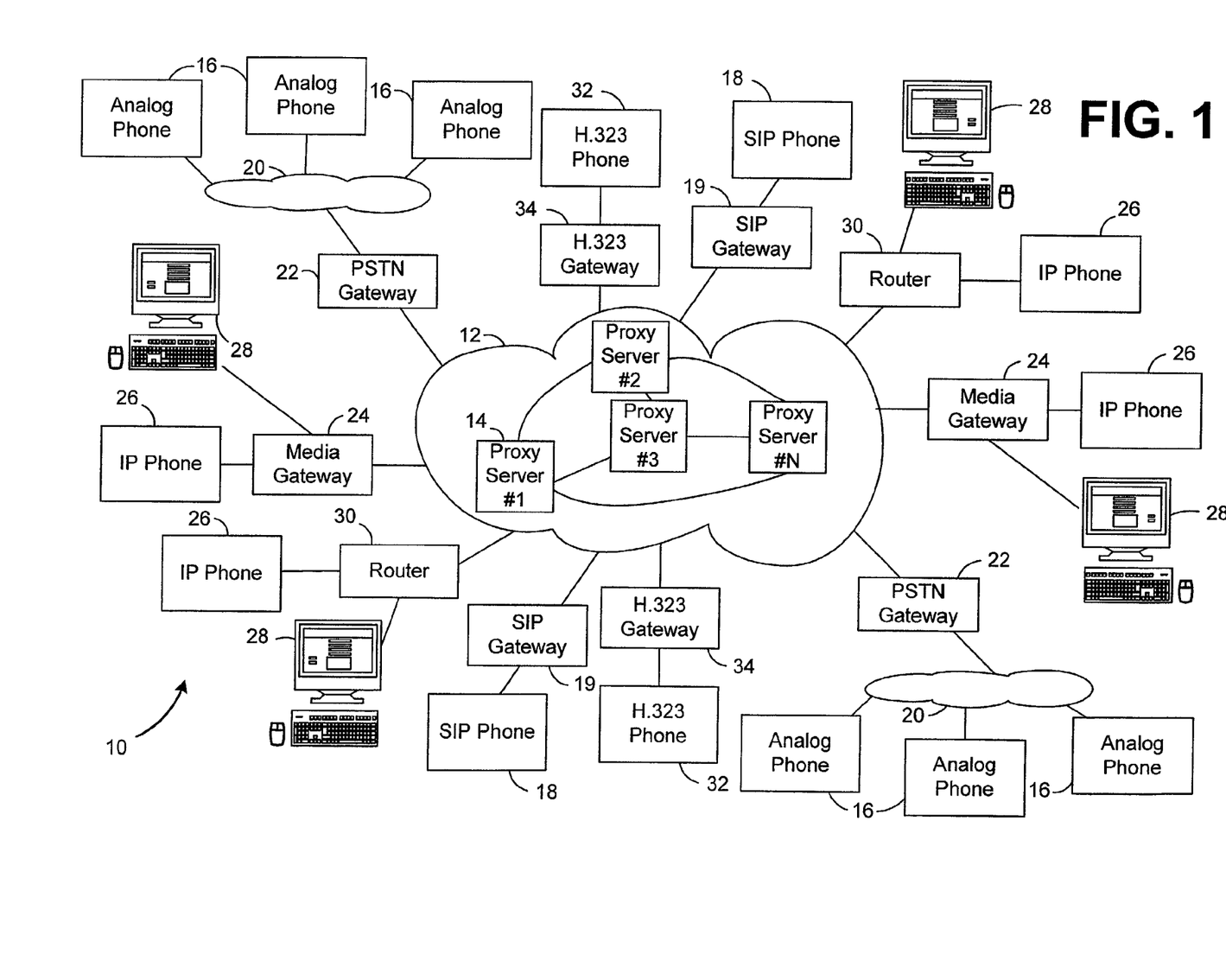
FIG. 1 is a system level diagram of a VoIP system including a plurality of VoIP proxy servers configured to shift workload automatically according to an embodiment of the present invention.

Referring initially to FIG. 1, an embodiment of a VoIP system, generally designated as 10, is shown. In the VoIP system 10, is a digital data network over which digitized voice signals are transmitted as a stream of packets. The underlying digital data network may be an IP network 12, for example, a proprietary network, a network of leased facilities, the Internet, an Intranet, a WAN, a LAN, a virtual private network (VPN), or the like, or a combination thereof. Within the IP network 12 are a plurality of VoIP proxy servers #1 through #N, for example. The plurality of VoIP proxy servers are coupled together, for example, via conventional network routing or other means known by those with ordinary skill in the art. One of the plurality of VoIP proxy servers is configured as a primary VoIP proxy server 14. The primary VoIP proxy server 14 is the VoIP proxy server designated as the portal through which a VoIP client accesses the VoIP system 10. The particular process by which a VoIP proxy server is identified to a VoIP client requesting to connect to the VoIP system is transparent to the VoIP client. The operation of the plurality of VoIP proxy servers, e.g., servers #1 through #N, in relation with a transmitting or calling VoIP client and a receiving VoIP client, will be further explained below with reference to FIGS. 2–5. It should be understood that included in the IP network 12 will be other network devices to complete the network such as gateways, routers, switches, etc. (not shown).

A plurality of conventional analog phones 16 may be coupled to the IP network 12 via a local PSTN gateway 22. The plurality of the analog phones 16 may be part of a local PSTN 20. Thus, the plurality of the analog phones 16 may access the VoIP system 10 locally using known techniques.

Additionally, various "Session Initiation Protocol" (SIP) phones 18 may be coupled to the IP network 12 via a SIP gateway 19, for example. A plurality of IP phones 26 and/or computers 28, for example, may also be coupled to the IP network 12 via various media gateways 24 and/or various routers 30. Additionally, various H.323 phones 32 may be coupled to the IP network 12 via an H.323 gateway 34, for example.

Each computer 28 may have, for example, a pair of speakers and a microphone (not shown) or may have a headset with a microphone (not shown). Alternatively, a computer video camera with a microphone may be coupled to the computer 28 (not shown). The computer 28 may be a personal computer (PC) configured as a multimedia computer, a mobile computing device such as a laptop computer or the like. The computer 28 may execute logic, e.g., software, in order to place a VoIP call.

As will be appreciated, the analog phones 16, the SIP phones 18, the IP phones 26, the computers 28, the H.323 phones 32, etc., via their respective gateways or routers, represent VoIP clients within the VoIP system 10. The VoIP clients are each capable of making and receiving telephone calls via the IP network 12 by transmitting and receiving digital voice data packets therebetween. The actual procedures and protocols for exchanging such data employs conventional VoIP techniques except as otherwise described herein. Thus, the description herein focuses primarily on the inventive aspects.

Next, the general operation of the VoIP system 10 will be described. As previously mentioned, the VoIP system 10 utilizes VoIP technology to allow voice calls to be originated and terminated on various types of platforms over the IP network 12. For example, the analog phones 16 supported by a conventional PSTN can place and receive calls over the IP network 12. Alternatively, a SIP phone 18, an IP phone 26 or a H.323 phone 32 can place a call to an analog phone 16 on a local PSTN. The local PSTN may be in another city, state or country. Further still, a computer 28 could call another computer 28, a SIP phone 18, an IP phone 26, an analog phone 16, a cell phone (not shown), a satellite phone (not shown) or the like, or a combination thereof.

In yet another alternative, any of the aforementioned VoIP clients may place a call to a VoIP proxy server which hosts special services. For example, a VoIP proxy server may host voice mail or video mail. The VoIP client can connect to the VoIP proxy server hosting the special services to retrieve voice or video mail in an otherwise conventional manner.

The VoIP technology translates a destination telephone number into a data network address ("IP address") associated with a corresponding terminating gateway nearest to the destination number. Using an appropriate protocol and packet transmission over the IP network 12, the terminating gateway will transmit the call directly to the VoIP client or initiate a call to the destination phone number over the local PSTN 20 at the receiving destination to establish completely end-to-end two-way communications. Despite the additional connections required, the overall call setup time is not significantly longer than with a call fully supported by a conventional PSTN.

In general, in order to complete a call by accessing the VoIP proxy servers on the IP network 12, a VoIP client establishes a connection with the primary VoIP proxy server 14. Next, the VoIP client requests to connect with the primary VoIP proxy server 14 in order to complete the call. The primary VoIP proxy server 14 determines whether its workload is below a predefined threshold and therefore can handle the call. If the primary VoIP proxy server 14 is able to handle the call, then the primary VoIP proxy server 14 responds to the client request to connect with its identity, e.g., its IP address. Upon receiving the response, the VoIP client proceeds to connect to the primary VoIP proxy server 14 to complete the call.

However, if the workload of the primary VoIP proxy server 14 is above the predefined threshold, then the primary VoIP proxy server 14 is considered unable to handle the call. In this case, the primary VoIP proxy server 14 automatically forwards the client request to connect to a next VoIP proxy server in accordance with a predefined sequence. The next VoIP proxy server in the predefined sequence determines whether its workload is below the predefined threshold and therefore can handle the call. The above process of automatically forwarding the VoIP client's request to connect to the next VoIP proxy server in the sequence continues until the request is received by a VoIP proxy server in the sequence whose workload is determined to be below the predefined threshold and therefore is capable of handling the call. The VoIP proxy server thus able to handle the call generates and transmits a response to the previous VoIP proxy server in the sequence, i.e., the VoIP proxy server which forwarded the request to connect. The response includes the identity of that particular VoIP proxy server which is able to handle the call. Such identification may be by an IP address, for example. Similarly, the response is forwarded by any other intervening VoIP proxy servers in the sequence back to the primary VoIP proxy server 14.

Next, the primary VoIP proxy server 14 generates a response to the client request to connect and transmits the response to the requesting VoIP client. Again, the response includes the identity (e.g., IP address) of the VoIP proxy server in the sequence which identified itself as able to handle the call. Once the response is received by the VoIP client, the VoIP client connects to the VoIP proxy server identified in order to establish the call in an otherwise conventional manner.

Thus, the VoIP client wishing to make a call via the IP network 12 first requests to connect to the primary VoIP proxy server 14 (i.e., VoIP proxy server #1). If the primary VoIP proxy server 14 is unable to handle the call, then the primary VoIP proxy server proceeds to forward the request in order to the VoIP proxy servers #2 through #N based on a predefined hierarchy or the like in order to identify a VoIP proxy server experiencing a lower workload. The VoIP client then establishes the call through that particular VoIP proxy server. In this manner, the present invention helps to avoid one or more VoIP proxy servers shouldering the majority of the workload while other of the VoIP proxy servers are underutilized at any given moment in time. This way, more optimum network connections may be established for each call, thereby reducing latency time, etc.

Additionally, the VoIP client only needs to connect initially to the primary VoIP proxy server 14. The automatic workload shifting process takes place within the group of VoIP proxy servers and may be totally transparent to the VoIP client. This reduces back and forth traffic between the VoIP proxy servers and the VoIP client if the same process was done individually by the VoIP client. Further, the method also helps to reduce the number of server addresses needed to be exposed to public. This is a significant help when a service provider needs to relocate or deploy a new VoIP proxy server to the system.

In the VoIP system 10, voice signals are digitized and transmitted as a stream of packets over the IP network 12. The IP network 12 allows each packet to find independently the most efficient path to the intended destination, thereby best using the network resources at any given instant. The packets associated with a single source may thus take many different paths to the destination in traversing the IP network 12, arriving with different end-to-end delays, arriving out of sequence, or possibly not arriving at all. At the destination, however, the packets are re-assembled and converted back into the original voice signal. VoIP technology insures proper reconstruction of the voice signals, compensating for echoes made audible due to the end-to-end delay, for jitter, and for dropped packets, etc.

Figure 2:
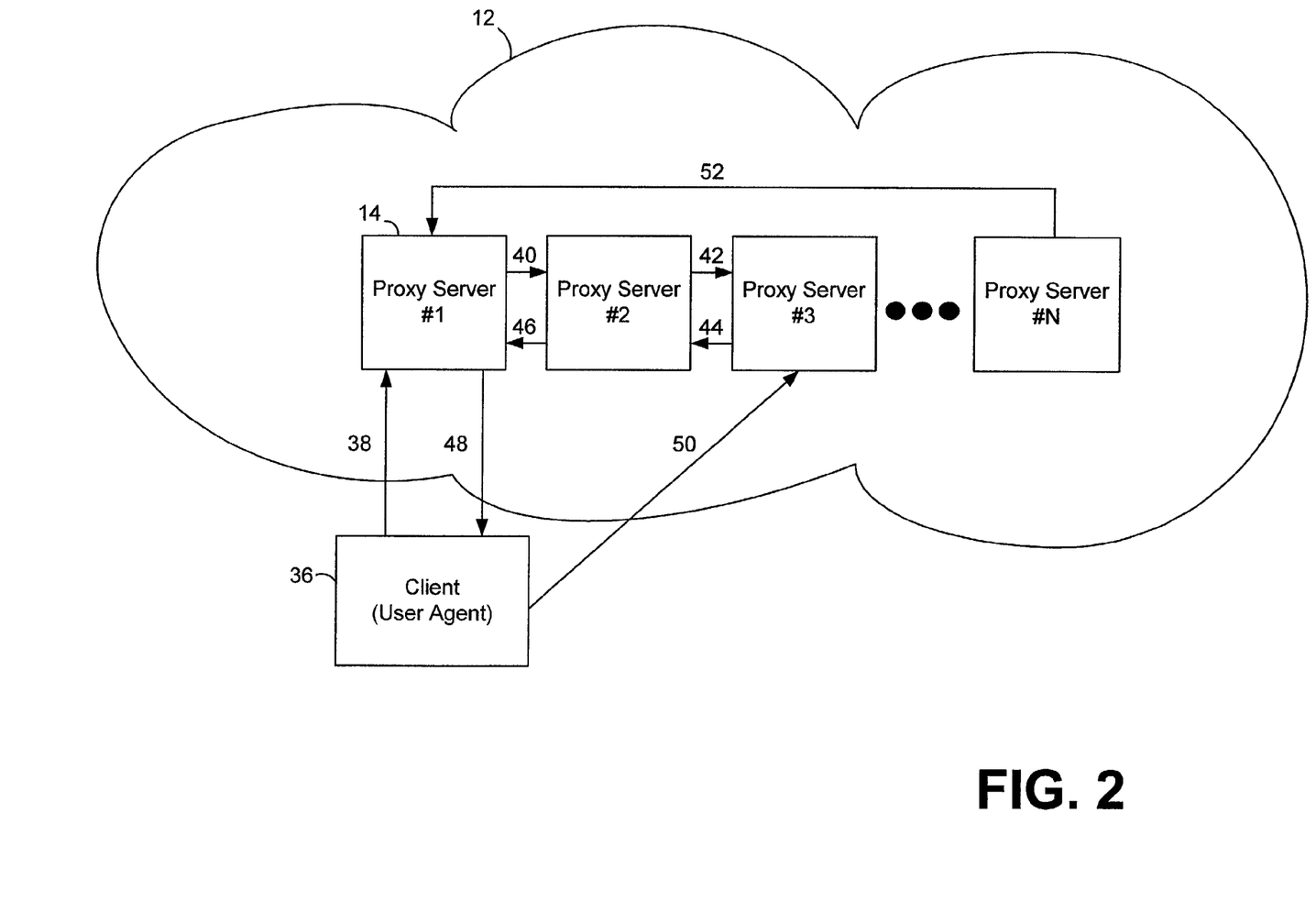
FIG. 2 is a detailed schematic flow diagram representing a VoIP client connecting to the VoIP system using the plurality of VoIP proxy servers configured to shift workload automatically in an embodiment of the present invention.

Turning now to FIG. 2, the IP network 12 is represented with a representative VoIP client 36 (hereinafter client 36) attempting to connect to the primary VoIP proxy server 14 (i.e., proxy server #1) in order to complete a VoIP call in accordance with the invention. The client 36 may be any device capable of transmitting and receiving voice or video data over a VoIP system 10. For example, the client 36 may take the form of one of the analog phones 16, the SIP phones 18, the IP phones 26, the computers 28, etc., which connect to the IP network 12 via its respective gateway or router. The steps of the call connection process will now be further explained with reference to FIGS. 3–5.

Figure 3:
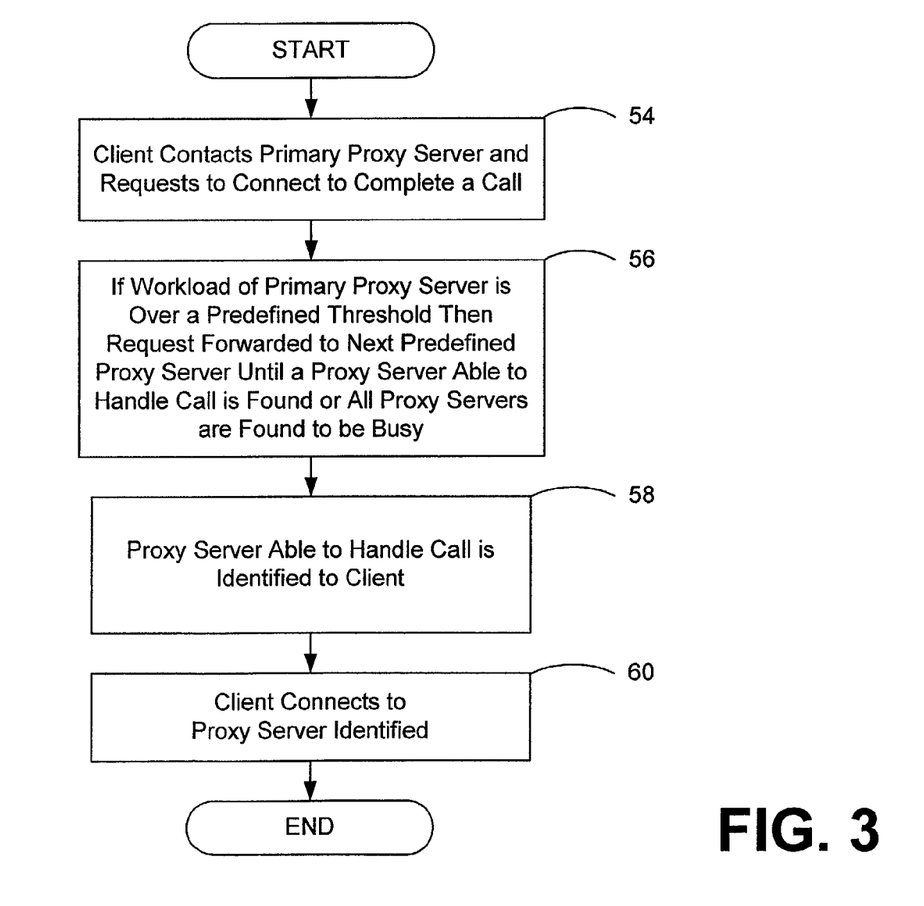
FIG. 3 is a flow diagram of a method for employing the plurality of VoIP proxy servers configured to shift workload automatically according to the present invention.

Referring to FIG. 3, the overall process is shown for identifying a VoIP proxy server in the VoIP system 10 in accordance with the present invention. In step 54, the primary VoIP proxy server 14 receives a request from client 36 to connect to the primary VoIP proxy server 14 in order to place a VoIP call. The client request to connect is represented by network connection line 38 in FIG. 2.

Next in step 56, the primary VoIP proxy server 14 determines whether its workload is below a predefined threshold and therefore can handle the call. If the primary VoIP proxy server 14 is able to handle the call, then the primary VoIP proxy server 14 responds to the client request to connect with a response including its identity. Upon receiving the response, the client 36 proceeds to connect to the primary VoIP proxy server 14 to complete the call. The particular manner in which the predefined workload threshold is determined and evaluated can be based on any of a variety of predetermined criteria. The present invention is not intended to be limited necessarily to any particular criteria for establishing or evaluating the predefined workload threshold.

However, if the workload of the primary VoIP proxy server 14 is above the predefined threshold, then the primary VoIP proxy server 14 considers itself unable to handle the call. In this instance, the primary VoIP proxy server 14 is configured to forward the client request to connect automatically to the next VoIP proxy server in the predefined sequence (e.g., proxy server #2). The next VoIP proxy server determines whether its workload is below the predefined threshold and therefore is able to handle the call.

If the workload of such next VoIP proxy server, e.g., proxy server #2, is above the predefined threshold, then the VoIP proxy server considers itself unable to handle the call. The VoIP proxy server, i.e., proxy server #2, is thus configured to forward the client request to connect automatically to the next VoIP proxy server in the predefined sequence, e.g., proxy server #3. This server now becomes the next VoIP proxy server in the sequence which processes the request to connect.

Such current VoIP proxy server (e.g., proxy server #3) then determines whether its workload is below the predefined threshold and therefore is able to handle the call. For this example, the VoIP proxy server #3 determines its workload is below the predefined threshold and therefore is able to handle a call. The VoIP proxy server #3 then generates and transmits a response to the request to connect to the previous VoIP proxy server in the sequence, i.e., the VoIP proxy server which forwarded the request to connect. The response includes the identity of that particular VoIP proxy server which is able to handle the call. Similarly, the response is forwarded by any other intervening VoIP proxy servers in the sequence back to the primary VoIP proxy server 14.

The forwarding of the request by the primary VoIP proxy server 14 to a next VoIP proxy server in the predefined sequence, i.e., proxy server #2, and a subsequent VoIP proxy server, i.e., proxy server #3, are represented by network connection lines 40 and 42, respectively, in FIG. 2. The response by the VoIP proxy server able to handle the call, i.e., proxy server #3, to the previous VoIP proxy server in the sequence, i.e., proxy server #2, and the forwarding of the response to the primary proxy server 14 are represented by network connection lines 44 and 46, respectively, in FIG. 2. It should be understood that the above process of automatically forwarding the client request to connect to the next VoIP proxy server in the predefined sequence may continue until the workload of a VoIP proxy server is determined to be below the predefined threshold and therefore capable of handling the call.

Next in step 58, the primary VoIP proxy server 14 responds to the client request to connect from the client 36 by providing the identity of the VoIP proxy server, i.e., proxy server #3, identified as able to handle the call, i.e., having a lower workload. The response, by the primary VoIP proxy server 14, that provides the identity of the VoIP proxy server to the client 36 is represented by network connection line 48 in FIG. 2. The identity of the VoIP proxy server may be, for example, an IP address or the like which the primary VoIP proxy server 14 provides to the client 36.

Next in step 60, the client 36 connects to the VoIP proxy server identified as able to handle the call in order to complete the VoIP call in an otherwise conventional fashion using known protocols, etc. In FIG. 2, VoIP proxy server #3 represents the VoIP proxy server identified as having the workload below the predefined threshold. The connection of client 36 to the VoIP proxy server #3 is represented by network connection line 50 in FIG. 2.

Now referring to FIG. 4, the specific steps carried out by the plurality of VoIP proxy servers configured for identifying the VoIP proxy server able to handle a call, e.g., the first VoIP proxy server in the predefined sequence with a workload below the predefined threshold will be described. In step 62, the primary VoIP proxy server 14 is configured to wait for a client request to connect to be received from the client 36.

Next in step 64, the primary VoIP proxy server 14 determines whether it has received a client request. If "no", then the primary VoIP proxy server 14 returns to step 62 to continue to wait for a client request to connect to be received. The return to step 62 is represented by line 66. However, if the answer is "yes", then the primary VoIP proxy server 14 proceeds to determine its ability to handle a call in step 68.

More specifically, in step 68 the primary VoIP proxy server 14 determines whether its workload is below a predefined threshold and therefore is able to handle the call. The particular manner in which the workload level is determined can be based on any of a variety of predetermined criteria. The present invention is not intended to be limited necessarily to any particular criteria for establishing the workload level.

If the workload of the primary VoIP proxy server 14 is not over the predefined threshold, then the primary VoIP proxy server 14 considers itself able to handle a call and continues to complete the call setup process in step 70.

For example, the primary VoIP proxy server 14 responds to the client request to connect with its IP address and acknowledgement to connect, for example. Upon receiving the response, the client 36 proceeds to connect to the primary VoIP proxy server 14 to complete the call in an otherwise conventional manner. However, if the workload of the primary VoIP proxy server 14, i.e., server #1, is over the predefined threshold, then the primary VoIP proxy server 14 considers itself unable to handle the call and proceeds to step 72.

In step 72, since the workload of the primary VoIP proxy server 14 is over the predefined threshold, the primary VoIP proxy server 14, e.g., server #1, is configured to forward the client request to connect automatically to the next VoIP proxy server in the predefined sequence. The forwarding of the client request to connect to the next predefined VoIP proxy server, i.e., server #2, is represented by network connection line 40 in FIG. 2.

Next in step 74, the next VoIP proxy server, i.e., server #2, determines whether its workload is below a predefined threshold and therefore is able to handle the call. If the workload of the next VoIP proxy server, e.g., proxy server #2, is above the predefined threshold, then the current VoIP proxy server considers itself unable to handle the call and proceeds to step 82. In step 82, the next VoIP proxy server determines whether it is the last VoIP proxy server in the predefined sequence.

If the answer is "no", the current VoIP proxy server returns to step 72 and forwards the client request to connect to the next VoIP proxy server in the predefined sequence, e.g., server #3. The forwarding of the client request to connect to the next VoIP proxy server, i.e., server #3, is represented by network connection line 42 in FIG. 2.

The process loops through steps 72, 74 and 82 until the workload of a VoIP proxy server is determined to be below the predefined threshold and therefore able to handle the call, i.e., the answer is "no" in step 74 or the VoIP proxy server determines its the last VoIP proxy server in the predefined sequence in step 82. In this exemplary scenario, proxy server #3 determines it is below the predefined threshold and has the workload capacity to handle the call.

Referring now to step 76, the particular VoIP proxy server determined to be able to handle the call, e.g., proxy server #3, responds to the client request to connect by transmitting a response to the previous predefined VoIP proxy server in the sequence, i.e., server #2. Server #2 forwards the response to the primary VoIP proxy server 14. The response by server #3 to server #2 is represented by network connection line 44 in FIG. 2. The forwarding of the response by server #2 to the primary VoIP proxy server 14 is represented by network connection line 46 also in FIG. 2.

Next in step 78, the primary VoIP proxy server 14 responds to the client request to connect from the client 36 by providing the identity of the VoIP proxy server currently able to handle the call, i.e., having a workload below the predefined threshold. The response by the primary VoIP proxy server 14 that provides the identity of the VoIP proxy server to the client 36 is represented by network connection line 48 in FIG. 2. The identity of the VoIP proxy server may be, for example, an IP address or the like which the primary VoIP proxy server 14 provides to the client 36.

Next in step 80, the client 36 connects to the VoIP proxy server identified as able to handle the call, i.e., having the workload below the predefined threshold using known network protocols, etc. For example, in FIG. 2, VoIP proxy server #3 represents the VoIP proxy server identified as having the workload below the predefined threshold. Client 36 connects to the VoIP proxy server #3 via the network connection line 50 in order to complete the VoIP call in otherwise conventional fashion.

Referring again to step 82, if the current VoIP proxy server is the last VoIP proxy server in the predefined sequence and its workload is over the predefined threshold, all the VoIP proxy servers are determined to be too busy to handle another call. The system proceeds to step 84 in which the client request to connect is forwarded back to the primary VoIP proxy server 14. The forwarding back of the client request to connect to the primary VoIP proxy server 14 is represented by network connection line 52 in FIG. 2. Next in step 86, the primary VoIP proxy server 14 replies to the VoIP client that all VoIP proxy servers in the VoIP system 10 are too busy to provide service. In this case, the user must try again later.

Thus, the method describes the relationship of the VoIP proxy servers including the VoIP proxy server group and the priority or sibling sequence between the VoIP proxy servers that belong to the same VoIP proxy server group. The method also discloses a method to determine the capability of a VoIP proxy server receiving a client request to connect to handle a call based on workload. Further, a sequence of protocols that forwards that request to a subsequent VoIP proxy server and determines if the subsequent VoIP proxy server will be able to respond to the client request to connect are also disclosed. Additionally, the method may include a means for terminating the client request to connect based on a present limitation to prevent an infinite loop.

Now referring to FIG. 5, the steps carried out by the VoIP client making the call and requesting to connect to the primary VoIP proxy server 14 will be described. In step 88, a user of the VoIP system 10 initiates a call on the VoIP system via a VoIP client (e.g., the analog phones 16, the SIP phones 18, the IP phones 26, etc.). The user may, for example, pick up the receiver of the IP phone 26. Alternatively, the user may execute a VoIP program on the VoIP compatible computer 28. Further still, the user may pick up a receiver of the analog phone 16.

In step 90, the VoIP client transmits the client request to connect to the primary VoIP proxy server 14 (represented by network connection line 38 in FIG. 2). As previously described, such client request to connect asks the primary VoIP proxy server 14 to connect in order to make a call.

Next in step 92, the client 36 receives a packet from the primary VoIP proxy server 14 containing the response to the client request to connect including the identity of the VoIP proxy server able to handle the call or a message indicating all the VoIP proxy servers are currently busy and unable to handle a call. In step 94, if an identity of a VoIP proxy server is received, the client 36 then proceeds to connect with the identified VoIP proxy server as represented by line 50 (FIG. 2) in order to establish the call in an otherwise conventional manner. Otherwise, the user may try again later.

It will further be appreciated that the VoIP system 10 may alternatively have configurations other than the configurations shown in FIG. 1. Thus, there has been disclosed a system and method of workload balancing by automatically shifting the workload to the VoIP proxy server able to handle a call, and providing such identity to a VoIP client so the VoIP client may connect to the VoIP system 10 in order to make a VoIP call. This method permits the more efficient use of the VoIP proxy servers by balancing the workload among the VoIP proxy servers more efficiently.

Figure 4:
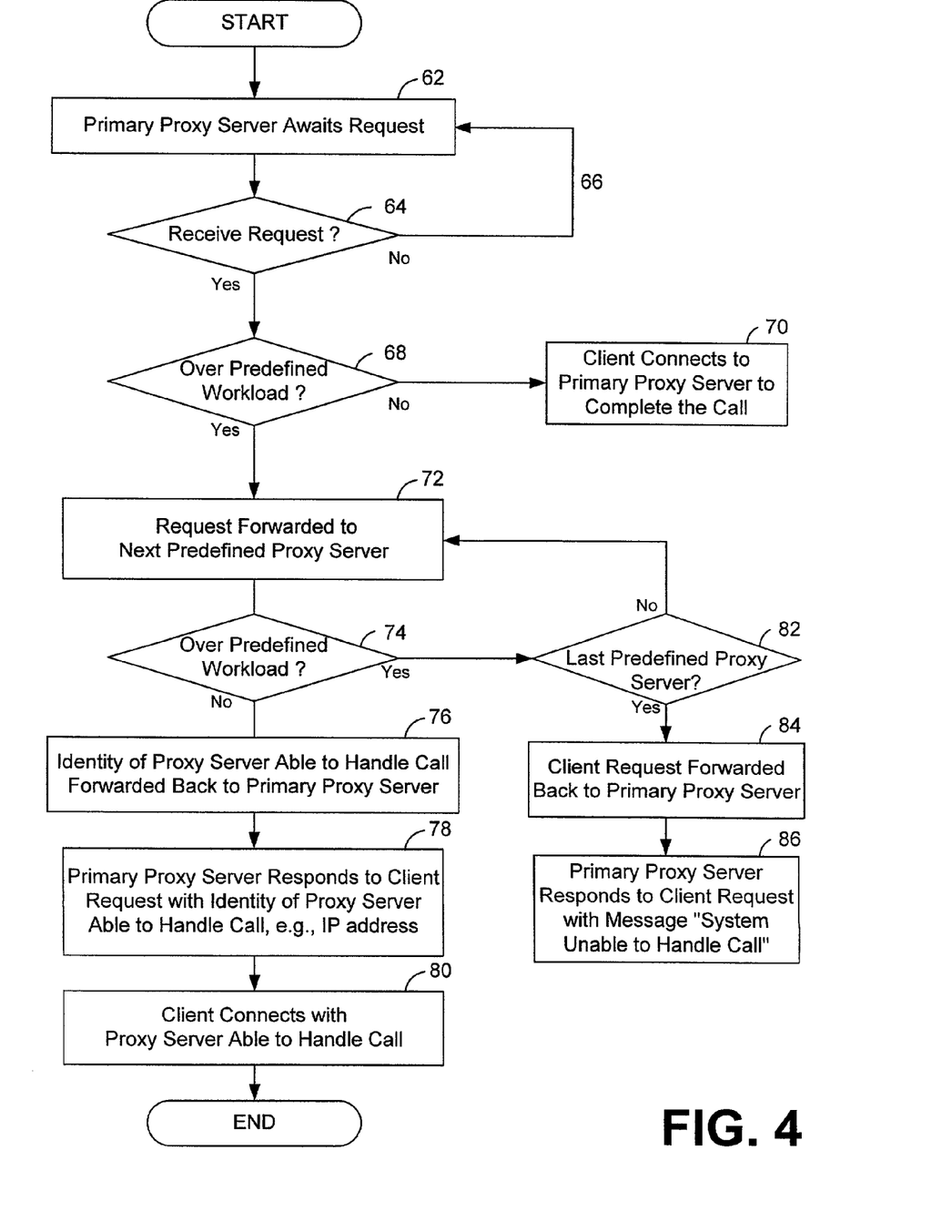
FIG. 4 is a flow diagram of a method for automatically identifying the VoIP proxy server with a lower workload according to an embodiment of the present invention.
Figure 5:
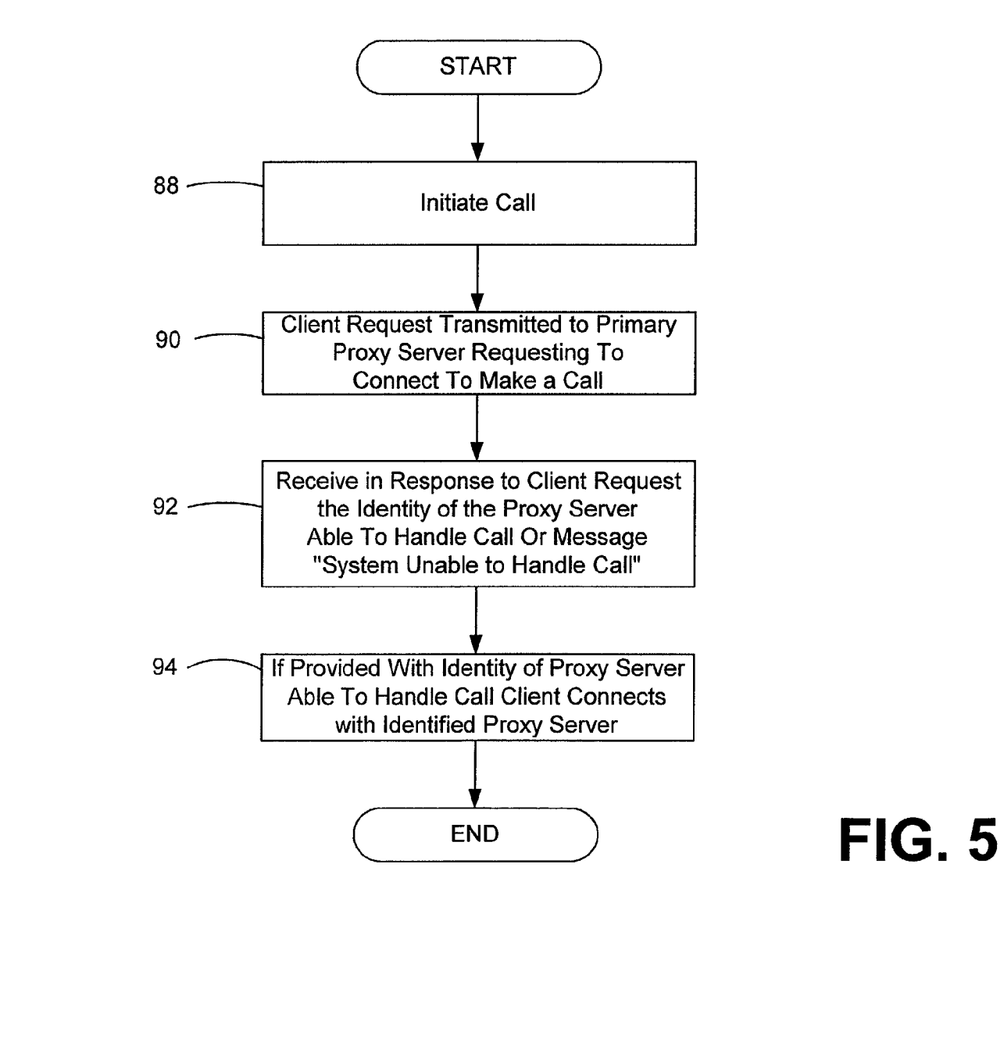
FIG. 5 is a flow diagram of a method for requesting the plurality of VoIP proxy servers configured to shift workload automatically to connect to a VoIP proxy server with a lower workload according an embodiment of the present invention.

Additionally, although the flow charts of FIGS. 3–5 show a specific order of execution, it is understood that the order of execution may differ from that which is depicted. For example, the order of execution of two or more blocks may be scrambled relative to the order shown. Also, two or more blocks shown in succession in FIGS. 3–5 may be executed concurrently or with partial concurrence.

It will further be appreciated that each of the respective devices described herein is programmed via conventional computer programming techniques to execute machine-readable code in order to carry out the operations described herein. Such programming may be easily performed by those having ordinary skill in the art of computer programming and IP technology based on the disclosure herein. Accordingly, the particular details of such programming code have been omitted for the sake of brevity.

Although particular embodiments of the invention have been described in detail, it is understood that the invention is not limited correspondingly in scope, but includes all changes, modifications and equivalents coming within the spirit and terms of the claims appended hereto.

What is claimed is:

1. A Voice-over-Internet Protocol (VoIP) system, comprising:
   a network including at least two VoIP proxy servers configured to shift workload automatically and to allow voice data to be transmitted and received over the network; and
   at least one VoIP client operatively coupled to the network to transmit and receive voice data over the network; wherein:
   one of the at least two VoIP proxy servers is a primary VoIP proxy server configured to shift workload automatically to another of the at least two VoIP proxy servers by forwarding a request to connect received from the VoIP client to a next one of the at least two VoIP proxy servers in accordance with a predefined sequence;
   the at least two VoIP proxy servers configured to continue to forward the client request to connect to the next one of the at least two VoIP proxy servers in the predefined sequence until the client request is received by one of the at least two VoIP proxy servers in the predefined sequence whose workload is below a predefined threshold;
   the one of the at least two VoIP proxy servers whose workload is below the predefined threshold configured to respond to the forwarded request to connect with an identity which is forwarded to the primary VoIP proxy server;

the primary VoIP proxy server configured to provide the identity to the at least one VoIP client; and the VoIP client configured to connect to the identified VoIP proxy server in order to transmit and receive voice data.

2. The VoIP system according to claim 1, wherein when a last one of the at least two VoIP proxy servers in the predefined sequence has a workload above the predefined threshold, the last one of the at least two VoIP proxy servers responds to the forwarded request to connect with a message to the primary VoIP proxy server that all VoIP proxy servers are above the predefined threshold and therefore are unable to handle the call; and wherein the primary VoIP proxy server responds to the client request to connect with a message indicating all the VoIP proxy servers are busy and are unable to handle a call at this time.

3. The VoIP system according to claim 1, wherein the network is one or more networks selected from a proprietary network, a network of leased facilities, the Internet, an Intranet, a wide-area network (WAN), a local-area network (LAN), or a virtual private network (VPN).

4. The VoIP system according to claim 1, wherein the at least one VoIP client is coupled to a gateway that is coupled to the network, wherein the gateway controls access to the network.

5. The VoIP system according to claim 3, wherein the gateway is one or more of a VoIP gateway, a VoIP PTSN gateway, a media gateway, or a router and an H.323 gateway.

6. The VoIP system according to claim 1, wherein the at least one VoIP client is one or more of an IP phone, a plain old telephone system (POTS) phone, a cell phone, a satellite phone, a microphone, a computer video camera with a microphone or a multi-media computer configured to transmit and receive voice data.

7. A method of balancing workload in a Voice-over-internet Protocol (VoIP) system that has at least one VoIP client and plural VoIP proxy servers, one of the VoIP servers being a primary VoIP proxy server for the VoIP client, comprising:

a) receiving a call connection request from the VoIP client with the primary VoIP proxy server;

b) the primary VoIP proxy server determining if the primary VoIP proxy server has a workload exceeding a predetermined threshold for the primary VoIP proxy server and, if not, the primary VoIP proxy server connecting with the client to complete the call, else:

i) forwarding the call connection request to a next one of the VoIP proxy servers from a predetermined hierarchy of the VoIP proxy servers;

ii) the VoIP proxy server that received the forwarded call connection request determining if the VoIP proxy server has a workload exceeding a predetermined threshold for the VoIP proxy server and, if not, responding to the forwarded request so that the primary VoIP provides the identity of the VoIP proxy server to the client and the VoIP client connects to the identified VoIP proxy server in order to transmit and receive voice data, else repeating b(i) and b(ii).

8. The method according to claim 7, wherein when a last one of the VoIP proxy servers in the predetermined hierarchy has a workload above a predetermined threshold for the VoIP proxy server, the last VoIP proxy servers responding to the primary VoIP proxy server with an indication that all VoIP proxy servers have a workload exceeding the respective predetermined thresholds for the VoIP proxy servers, and the primary VoIP proxy server responding to the VoIP client call connection request with a message that the VoIP system is busy.

* * * * *